(12) United States Patent
Harvey et al.

(10) Patent No.: US 10,131,251 B2
(45) Date of Patent: Nov. 20, 2018

(54) SEAT ADJUSTER ASSEMBLY

(75) Inventors: Jeffrey K. Harvey, Windsor (CA); Thomas Lee Rorabacher, Livonia, MI (US)

(73) Assignee: Lear Corporation, Southfield, MI (US)

(*) Notice: Subject to any disclaimer, the term of this patent is extended or adjusted under 35 U.S.C. 154(b) by 0 days.

(21) Appl. No.: 13/487,988

(22) Filed: Jun. 4, 2012

(65) Prior Publication Data

US 2013/0319167 A1 Dec. 5, 2013

(51) Int. Cl.
*B60N 2/08* (2006.01)

(52) U.S. Cl.
CPC .......... *B60N 2/0818* (2013.01); *B60N 2/085* (2013.01); *B60N 2/0881* (2013.01); *Y10T 74/20612* (2015.01)

(58) Field of Classification Search
CPC .. B60N 2/0705; B60N 2/0881; B60N 2/0843; B60N 2/0818; B60N 2/123; B60N 2/085
USPC .... 248/419, 421, 424, 429, 430, 65.14, 500, 248/503.1; 296/65.13
See application file for complete search history.

(56) References Cited

U.S. PATENT DOCUMENTS

| | | | |
|---|---|---|---|
| 4,961,559 A | 10/1990 | Raymor | |
| 5,799,920 A * | 9/1998 | Wittkowsky | B60N 2/0705 248/429 |
| 6,036,157 A * | 3/2000 | Baroin | B60N 2/0705 248/429 |
| 6,176,460 B1 * | 1/2001 | Kojima | B60N 2/0705 248/429 |
| 7,082,854 B2 | 8/2006 | Goodbred et al. | |
| 7,222,918 B2 * | 5/2007 | Bronner | B60N 2/0881 297/341 |
| 7,293,752 B2 * | 11/2007 | McCulloch | B60N 2/0705 248/424 |
| 7,318,573 B2 * | 1/2008 | Yamada | B60N 2/0705 248/424 |
| 7,922,143 B2 * | 4/2011 | Park | B60N 2/0705 248/424 |
| 8,360,838 B2 | 1/2013 | Kimura et al. | |

(Continued)

FOREIGN PATENT DOCUMENTS

| | | |
|---|---|---|
| CN | 101326077 A | 12/2008 |
| CN | 102343838 A | 2/2012 |

(Continued)

OTHER PUBLICATIONS

Chinese Office Action, Application No. CN 2013102157188, dated Jun. 3, 2016.

(Continued)

*Primary Examiner* — Muhammad Ijaz
(74) *Attorney, Agent, or Firm* — MacMillan, Sobanski & Todd, LLC

(57) ABSTRACT

A handle adjuster assembly for a seat track locking mechanism. The handle adjuster assembly includes a seat member and a lever pivotally attached to the seat member. The lever has a first end and a second end adapted to engage with the seat track locking mechanism. A handle is pivotally attached to the first end of the lever at a pivot such that the handle is free to rotate in a first rotational direction relative to the lever about the pivot, and wherein the handle is prevented from rotating in a second rotational direction opposite the first rotational direction about the pivot.

8 Claims, 9 Drawing Sheets

(56) References Cited

U.S. PATENT DOCUMENTS

| | | |
|---|---|---|
| 8,469,327 B2 | 6/2013 | Hayashi |
| 8,528,974 B2 | 9/2013 | Nihonmatsu et al. |
| 8,770,534 B2 * | 7/2014 | Nakamura ........... B60N 2/0705 248/429 |
| 2008/0277986 A1 | 11/2008 | Herringshaw et al. |
| 2011/0012004 A1 * | 1/2011 | Wieclawski ......... B60N 2/0705 248/429 |
| 2011/0121154 A1 * | 5/2011 | Kimura ................ B60N 2/0705 248/429 |
| 2012/0001049 A1 * | 1/2012 | Selbold ................ B60N 2/0818 248/429 |
| 2012/0132777 A1 * | 5/2012 | Nakamura ........... B60N 2/0705 248/429 |
| 2012/0132778 A1 * | 5/2012 | Nakamura ........... B60N 2/0705 248/429 |

FOREIGN PATENT DOCUMENTS

| | | |
|---|---|---|
| DE | 20208719 U1 | 7/2003 |
| GB | 2410057 B | 8/2006 |
| JP | 2009241919 A | 10/2009 |
| WO | 2011/136049 A1 | 11/2011 |
| WO | 2011136049 A1 | 11/2011 |

OTHER PUBLICATIONS

German Office Action, Application No. DE 10 2013 210 329.8, dated Apr. 8, 2015.
German Office Action, Application No. 102013201329.8 dated Mar. 22, 2016.

* cited by examiner

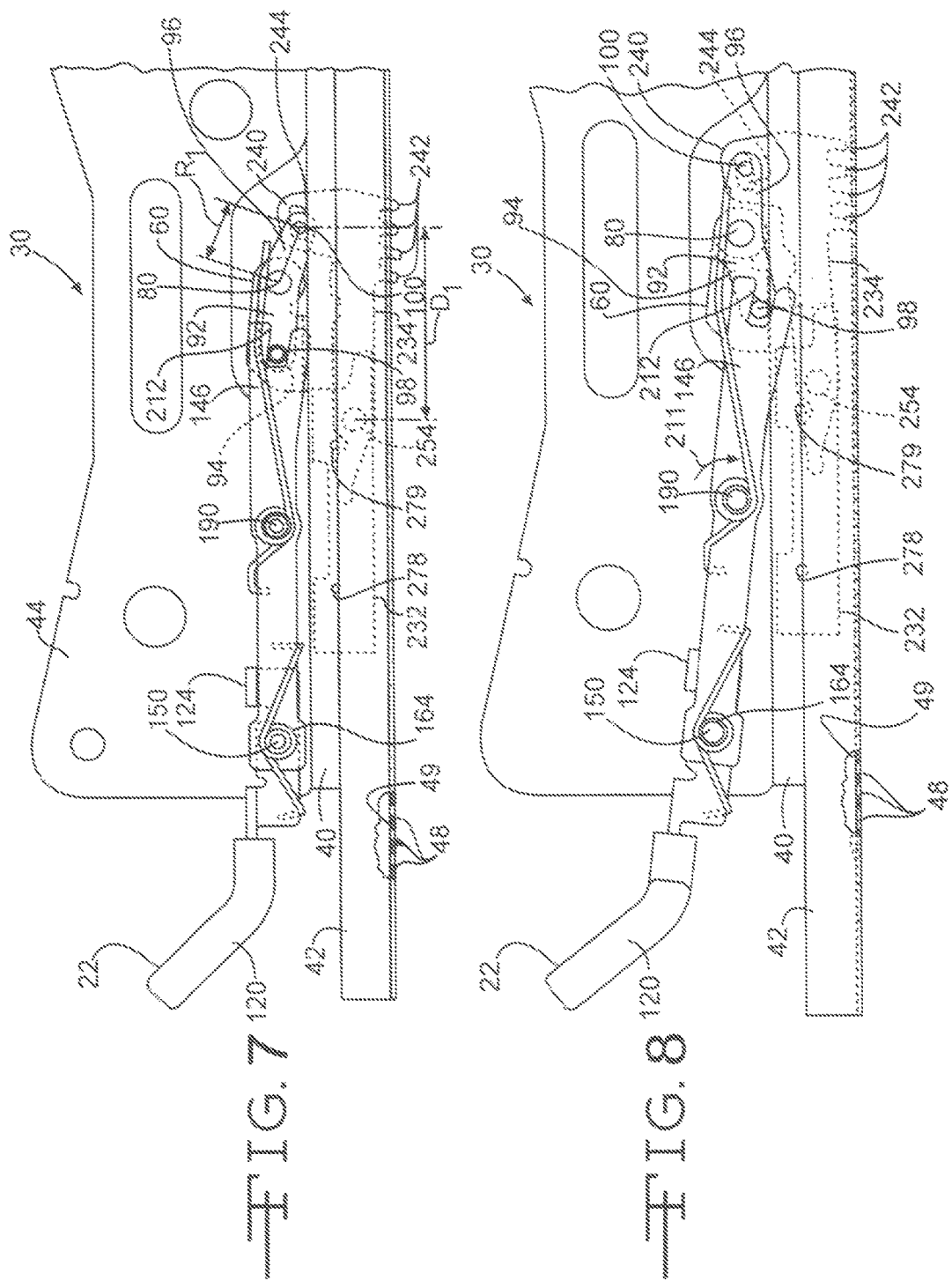

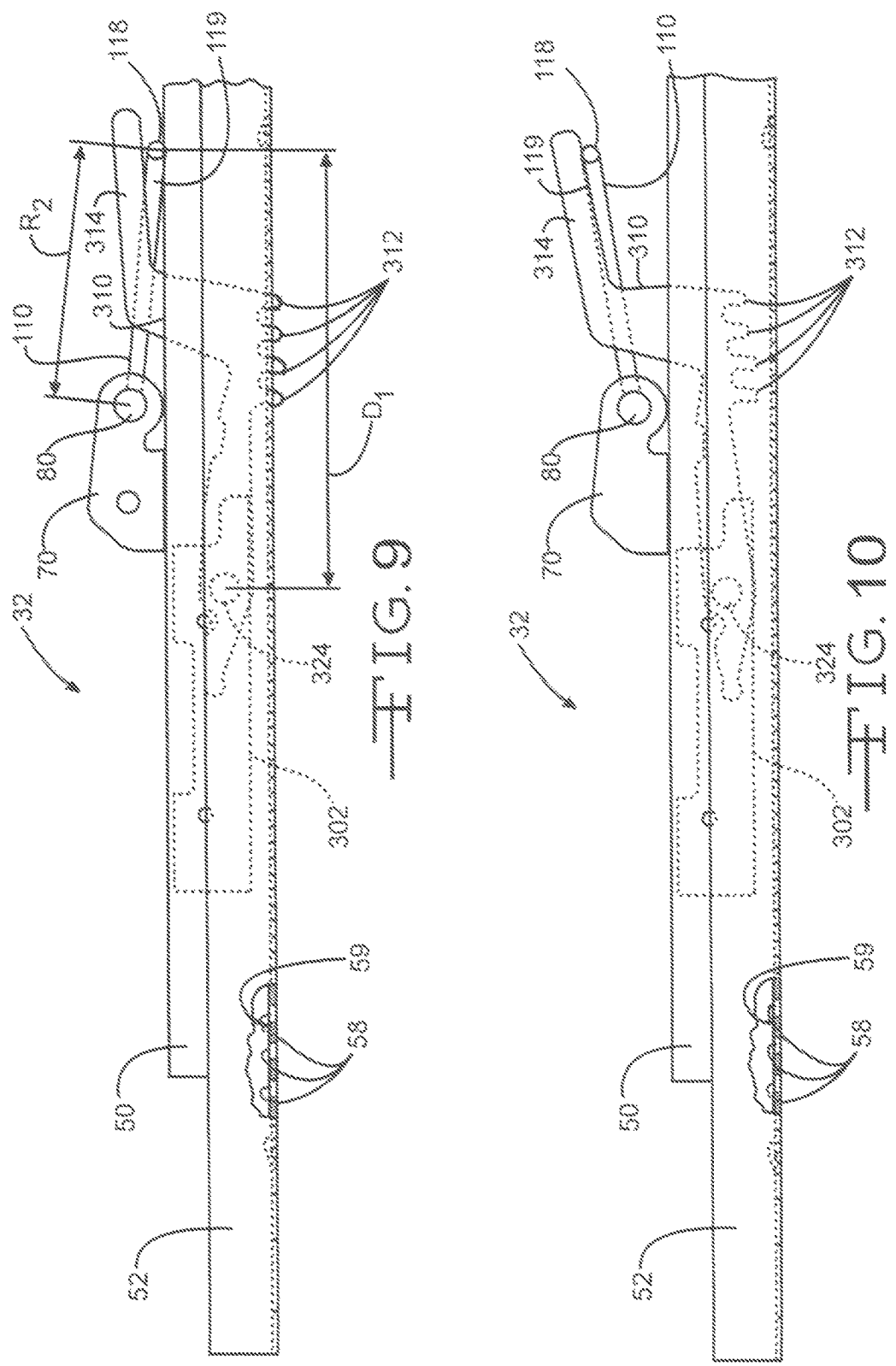

SEAT ADJUSTER ASSEMBLY

BACKGROUND OF THE INVENTION

This invention relates in general to adjustable seats and in particular to vehicle seats whose position may be adjusted fore and aft.

Vehicles, such as passenger cars, typically include seats for the use of a driver and other occupants. In many vehicles, the position of the seats may be adjusted for the comfort of the driver or the occupant. The options to adjust the position of a seat typically include the ability to move the seat fore and aft. To accomplish this movement, the seat commonly includes a seat adjuster assembly having a pair of track assemblies mounted under a seat bottom of the seat. One track assembly is mounted on the inboard side of the seat and the other track assembly is mounted on the outboard side of the seat. Each of the track assemblies includes an upper track which slides relative to a lower track. The upper tracks are attached to the seat bottom. The lower tracks are attached to the floor of the vehicle. A latching or locking mechanism is typically provided in or on each of the track assemblies which includes locking members which selectively lock the upper track relative to the respective lower track. To adjust the fore and aft position of the seat, the locking mechanisms are actuated to unlock the track assemblies. The seat is then moved to a desired position. The locking mechanisms are then actuated to their locked position. The locking mechanisms often include triggers pivotally mounted on one of the upper and lower tracks. The triggers have a plurality of teeth which are selectively disposed in slots formed in the other of the respective upper and lower track to lock the locking mechanism. The triggers are connected to a handle or towel bar which is pulled by the occupant or other user of the seat to lock and unlock the teeth of the triggers within the corresponding slots.

There is illustrated in FIGS. 13 through 15 a prior art outboard upper track assembly, indicated generally at 500. The upper track assembly includes a first track member 502 and a second track member 504. The members 502 and 504 are formed from stamped plates and are attached together. Sandwiched between the members 502 and 504 is a generally flat outboard trigger 510 having a plurality of teeth 512 that selective engage with a plurality of apertures (not shown) in a lower track assembly (not shown). The outboard trigger 510 is pivotally attached to the first and second track members 502 and 504 when assembled and pivots about a pivot 514. A lever 520 is pivotally attached to the members 502 and 504 when assembled and pivots about a pivot 522. The lever 520 has a lateral extension 523 which is connected with a pull handle or towel bar (not shown) which is rotated by the occupant or user of the seat to lock and unlock the outboard upper track assembly. The lever 520 includes a slot 524 that receives a rounded end 526 of the trigger 510 such that pivoting of the lever 510 in a first rotational direction will cause pivoting of the trigger 510 in a second rotational direction opposite the first rotational direction. Rotation of the trigger 510 either lifts or seats the teeth 512 with the corresponding apertures of the lower track member (not shown). There is illustrated in FIG. 16 a prior art inboard upper track assembly, indicated generally at 540. The inboard upper track assembly 530 is similar to the outboard upper track assembly 500 and includes a first track member 542, a second track member 544, a lever 546, and a lever 548. The trigger 546 is pivotally attached to the members 542 and 544 at a pivot 550. The trigger 546 includes a rounded end 552 which is received in a slot 554 of the lever 548. The lever 548 is pivotally attached to the members 542 and 544 at a pivot 558. The lever 548 has a lateral extension 549 which is connected with the towel bar (not shown) connected to said lateral extension 523 such that the lateral extensions 523 and 549 are connected together. which is rotated by the occupant or user of the seat to lock and unlock the outboard upper track assembly A distance A between the pivot 522 and the slot 524 of the outboard lever 520 is greater than a distance C between the pivot 558 and the slot 554 of the inboard lever 548. A distance B between the rounded end 526 and the pivot 514 of the outboard trigger 510 is less than a distance D between the rounded end 552 and the pivot 550 of the inboard trigger 546. These different dimensions, A, B, C, and D enable the inboard trigger 546 to pivot at a faster rate than the outboard trigger 510 when rotated by their cooperating levers 548 and 520, respectively. This arrangement is desirable when a seat belt load attachment point acts on the inboard track assembly 540 but not the outboard track assembly 500.

SUMMARY OF THE INVENTION

This invention relates to seats and, in particular, a handle adjuster assembly for a seat track locking mechanism. The handle adjuster assembly includes a seat member and a lever pivotally attached to the seat member. The lever has a first end and a second end adapted to engage with the seat track locking mechanism. A handle is pivotally attached to the first end of the lever at a pivot such that the handle is free to rotate in a first rotational direction relative to the lever about the pivot, and wherein the handle is prevented from rotating in a second rotational direction opposite the first rotational direction about the pivot.

Various aspects of this invention will become apparent to those skilled in the art from the following detailed description of the preferred embodiments, when read in light of the accompanying drawings.

BRIEF DESCRIPTION OF THE DRAWINGS

FIG. 7 is a side elevational view, partially in section, of the inboard side of the seat adjuster assembly illustrating the inboard trigger assembly in a locked position.

FIG. 8 is a side elevational view of the inboard side of the seat adjuster assembly illustrating the inboard trigger assembly in an unlocked position.

FIG. 9 is a side elevational view, partially in section, of the outboard side of the seat adjuster assembly illustrating the outboard trigger assembly in a locked position.

FIG. 10 is a side elevational view of the outboard side of the seat adjuster assembly illustrating the outboard trigger assembly in an unlocked position.

DETAILED DESCRIPTION OF THE PREFERRED EMBODIMENTS

Figure 1:
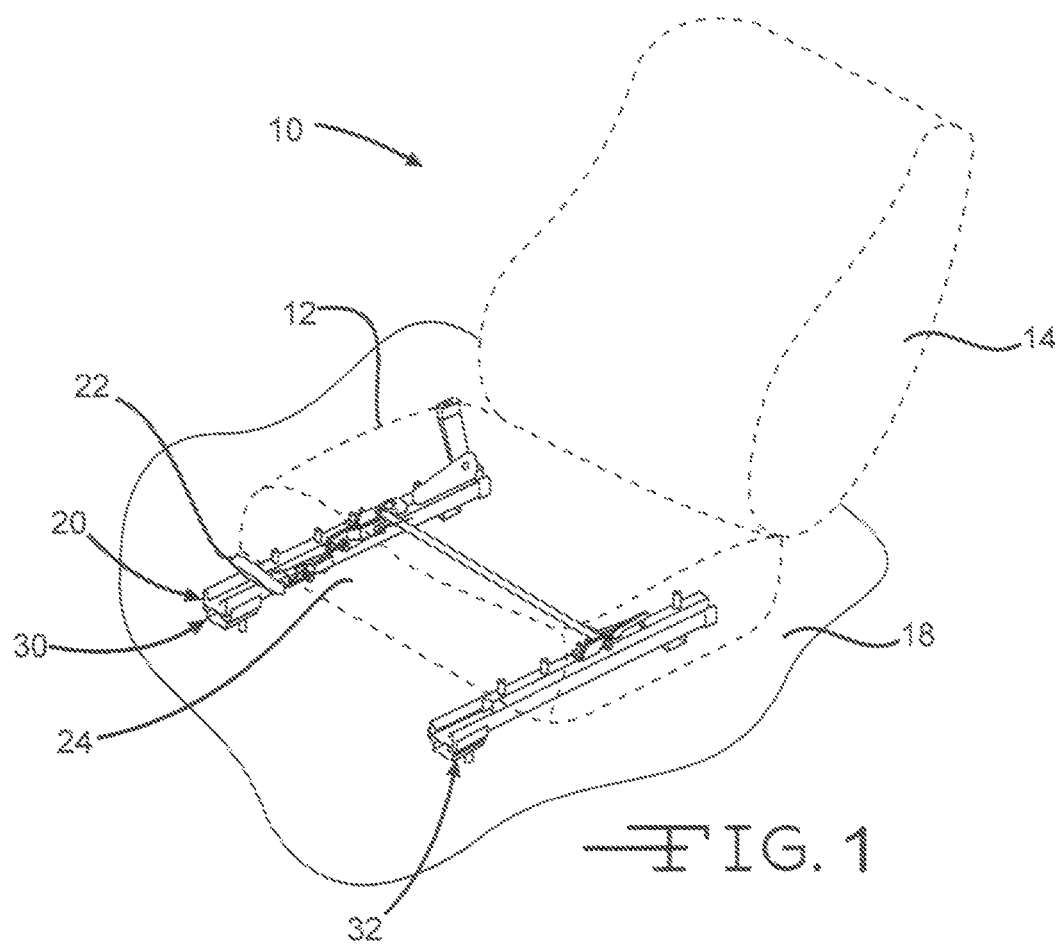
FIG. 1 is a perspective view of a seat having a seat adjuster assembly.

Referring now to the drawings, there is illustrated in FIG. 1 a vehicle seat, indicated generally at broken lines 10. The seat 10 may be in the form of a bucket style seat such that the seat 10 is made for single occupancy, such as a front row driver or passenger seat. However, it should be understood that the seat 10 can be configured other than what is shown and described such as, for example, a bench style seat for supporting multiple occupants. The seat 10 includes a seat bottom 12 and a seat back 14. The seat bottom 12 and seat back 14 may be cushioned and upholstered for aesthetics and for the comfort of the occupants. The seat bottom 12 and the backrest 14 may also be upholstered with leather, fabric, or other desired materials.

The seat 10 can include a recliner mechanism (not shown) that permits the seat back 14 to pivot relative to the seat bottom 12 to a desired generally upright normal use position. The recliner mechanism (not shown) can be operated to a locked position to maintain the seat back 14 at the desired upright position. Thus, the seat back 14 may be moved to one of a plurality of upright normal use positions. The seat 10 is supported on a vehicle floor 18 by a seat adjuster assembly, indicated generally at 20. The seat adjuster assembly 20 provides support for the seat 10, as well as enabling the seat 10 to be moved in fore and aft longitudinal directions relative to the vehicle floor 18. As will be discussed in detail below, the occupant of the seat 10 lifts a spring biased handle 22 of the seat adjuster assembly 20 upward, as viewing FIG. 1, to actuate the seat adjuster assembly 20 into an unlocked position to enable the occupant to move the seat 10 relative to the floor 18 to a desired position. Once at the desired position, the occupant releases the handle 22 to actuate the seat adjuster assembly 20 into a locked position such that the seat 10 is fixed in the fore and aft directions relative to the vehicle floor 18. The handle 22 may be located at a front portion 24 of the seat bottom 12 for easy access for the occupant.

Figure 2:
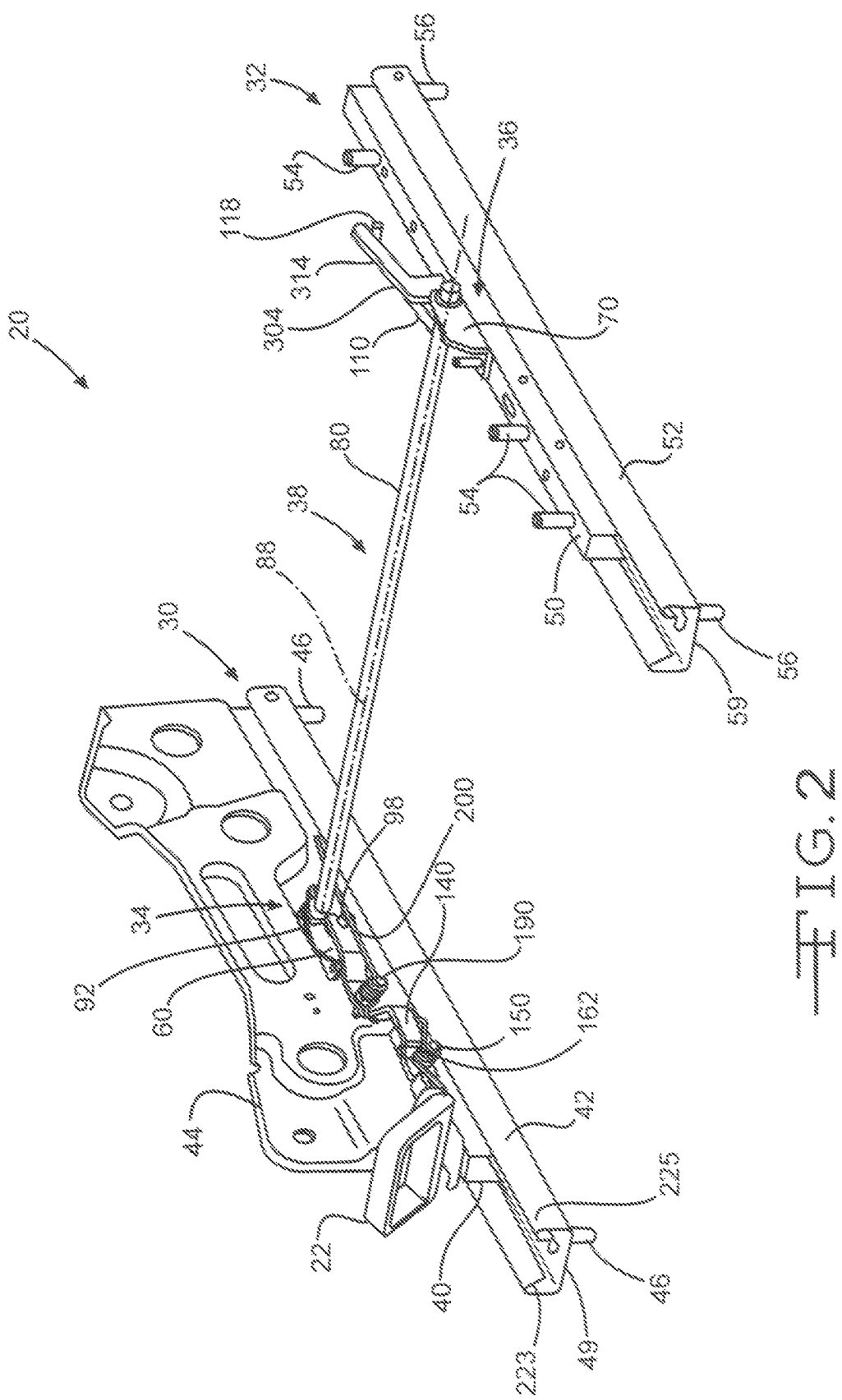
FIG. 2 is a perspective view of the seat adjuster assembly of FIG. 1.

As shown in FIG. 2, the seat adjuster assembly 20 includes an inboard track assembly, indicated generally at 30, and an outboard track assembly, indicated generally at 32. As will be discussed in detail below, the inboard and outboard track assemblies 30 and 32 include inboard and outboard latch assemblies 34 and 36, respectively. The latch assemblies 34 and 36 are actuated by a handle adjuster assembly, indicated generally at 38. Note that the handle adjuster assembly 38 is shown separately in FIG. 3. Note that the terms "inboard" and "outboard" used herein are for the purpose of reference only, and are not intended to be limiting.

Referring now to FIG. 2, the inboard track assembly 30 includes an upper track 40 and a lower track 42. The tracks 40 and 42 may be formed from elongated sheets of metal, such as steel, that are formed and/or machined to a desired configuration. Of course, the upper and lower tracks 40 and 42 may be formed from any suitably rigid materials and may be formed as a single structure or multiple components attached together. The upper and lower tracks 40 and 42 are slidably mounted to each other such that the upper track 40 can be moved in a longitudinal fore or aft direction relative to the lower track 42. The upper and lower tracks 40 and 42 can be formed with any suitable mating flanges, grooves or slots to permit such sliding configuration. The inboard track assembly 30 may also include rollers (not shown) disposed between portions of the upper track 40 and the lower track 42 to provide a rolling engagement therebetween. Alternatively, guide members (not shown) made of a material having a relatively low coefficient of friction may be disposed between the upper and lower tracks 40 and 42.

The upper track 40 is mounted to the seat bottom 12. In the embodiment shown in FIG. 2, a riser 44 is bolted, welded, or otherwise attached to the upper track 40. The riser 44 may form a portion of the seat bottom 12 or may be separately attached to the seat bottom 12. The riser 44 may be formed from a stamped sheet or plate that extends upwardly from the upper track 40 when attached thereto. As will be explained in further detail below, the riser 44 provides pivot mounting locations for various components of the handle adjuster assembly 38.

The lower track 42 can be attached to the vehicle floor 18 by any suitable manner. For example, the lower track 42 may be attached to the vehicle floor 18 by a plurality of mounting bolts 46 attached to the lower track 42 and extending downwardly therefrom. Corresponding nuts (not shown) threadably engage with the bolts 46 to secure the lower track 42 to the vehicle floor 18. Alternatively, the vehicle floor 18 may be provided with bolts (not shown) extending upwardly therefrom which are received in holes (not shown) formed in the lower track 42. As best shown in FIGS. 7 and 8, the lower track 42 includes a plurality of spaced apart apertures 48 formed in a bottom wall 49 of the lower track 42. The apertures 48 extend in the longitudinal direction along the length of the lower track 42. The apertures 48 are spaced apart from one another by a common distance. As will be explained in detail below, the apertures 48 cooperate with components of the latch assembly 34 to provide for an adjustable locking arrangement between the upper and lower tracks 40 and 42 so that the seat 10 can be moved and then locked into one of a plurality of incrementally spaced apart positions.

The outboard track assembly 30 is similar to the inboard track assembly 32. As shown in FIG. 2, the outboard track assembly 32 includes an upper track 50 and a lower track 52 which may be formed from elongated sheets of metal, such as steel, that are formed and/or machined to a desired configuration. The upper and lower tracks 50 and 52 are slidably mounted to each other such that the upper track 50 can be moved in the longitudinal fore or aft direction relative to the lower track 52. The upper and lower tracks 50 and 52 can be formed with any suitable mating flanges, grooves or slots to permit such sliding configuration. The upper track 50 is mounted to the seat bottom 12. In the embodiment shown in FIG. 2, a plurality of mounting bolts 54 extend upwardly from the upper track 50 for attachment to a riser (not shown) or other portion of the seat bottom 12. As shown in FIGS. 9 and 10, the lower track 52 includes a plurality of spaced apart apertures 58 formed in a bottom wall 59 of the lower track 52. The apertures 48 extend in the longitudinal direction along the length of the lower track 42. It should be understood that the inboard and outboard track assemblies 30 and 32 may be oriented differently than what is shown in FIGS. 1 and 2. For example, one or both of the track assemblies 40 and 42 may be arranged in an angled or sideways manner such that the respective lower track is mounted to a side wall of the vehicle floor 18 instead of a generally horizontal floor portion.

Figure 3:
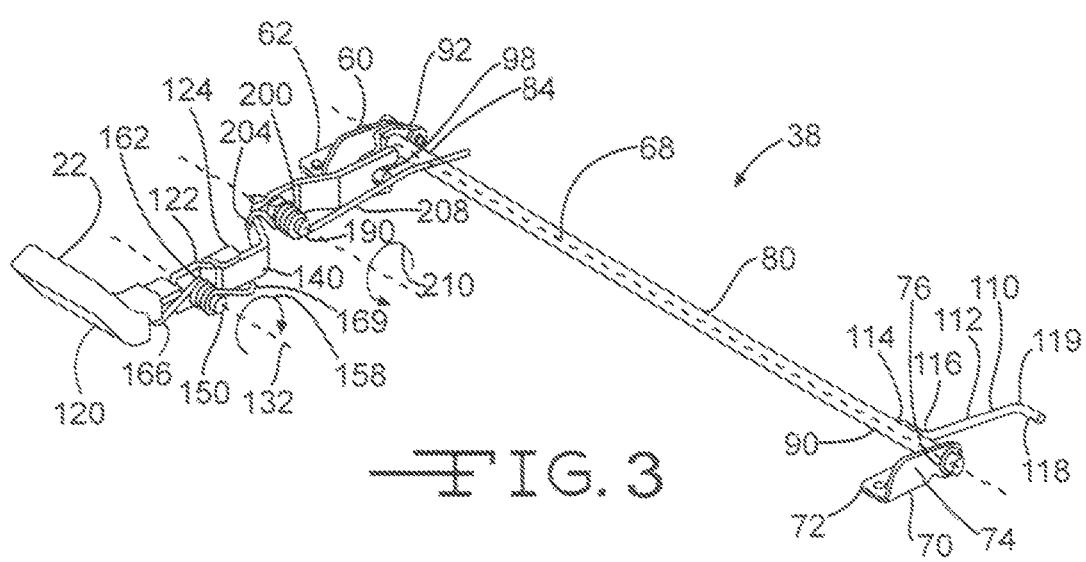
FIG. 3 is a perspective view of a handle adjuster assembly of the seat adjuster assembly of FIG. 2.
Figure 4:
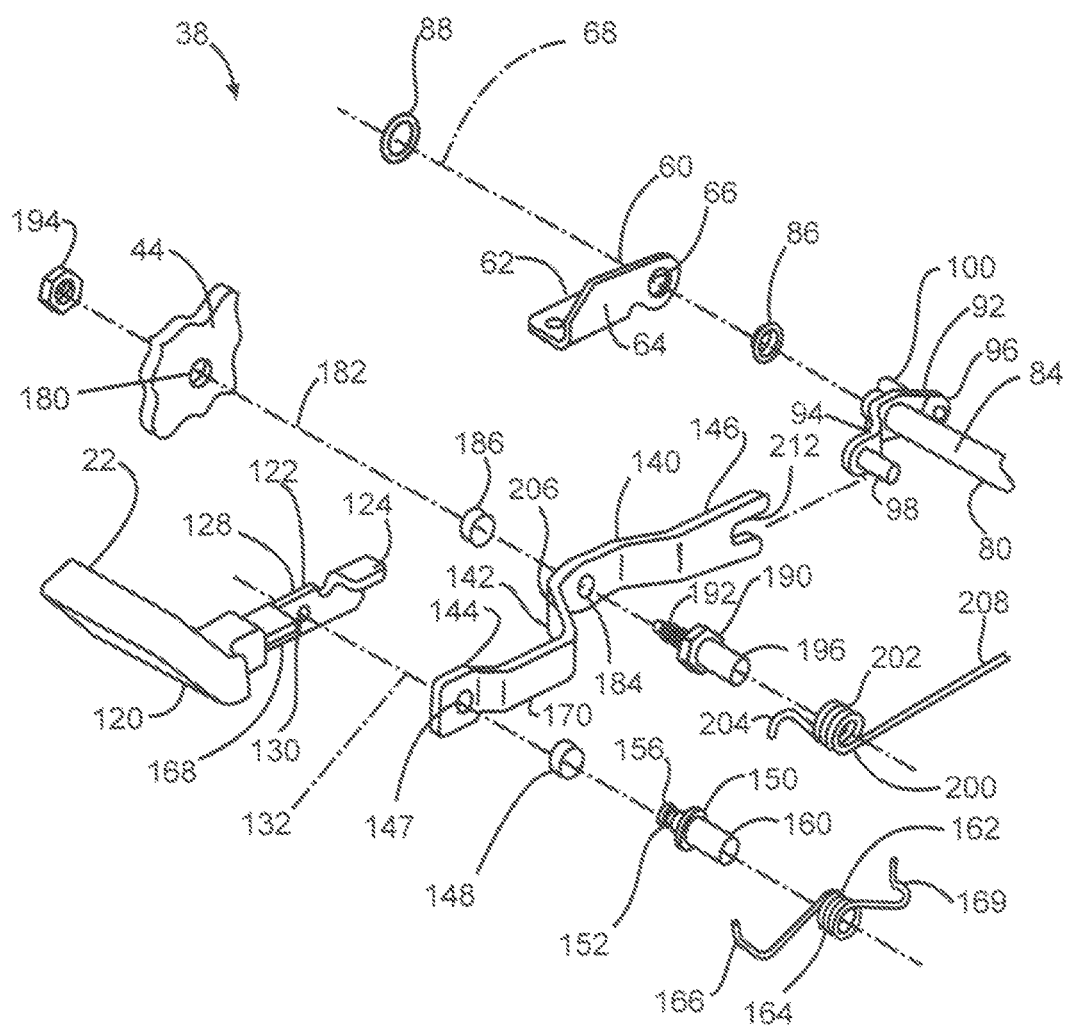
FIG. 4 is an exploded perspective view of a portion of the handle adjuster assembly of FIG. 3.

Referring now to FIGS. 2 through 4, the handle adjuster assembly 38 includes an inboard bracket 60 which is attached and fixed to the upper track 40 of the inboard track assembly 30. As best shown in FIG. 4, the inboard bracket 60 may be in the form of an L-shaped bracket having a generally horizontal bottom portion 62 and a vertically extending wall 64. The bottom portion 62 may be attached to the upper track 40 by any suitable manner such as by welding or by separate fasteners. The wall 64 includes a pivot hole 66 formed therein defining a pivot axis 68. The handle adjuster assembly 38 also includes an outboard bracket 70, as best shown in FIG. 3, which is similar to the inboard bracket 60. The outboard bracket 70 includes a bottom portion 72 and a wall 74. The bottom portion 72 is attached to the upper track 50 of the outboard track assembly 32. The wall 74 includes a pivot hole 76 formed therein.

A torsion bar 80 extends between the inboard and outboard brackets 60 and 70. The torsion bar 80 is pivotally mounted on the inboard and outboard brackets 60 and 70 such that it is rotatable along the axis 68. The torsion bar 80 may be pivotally attached to the inboard and outboard brackets 60 and 70 by any suitable manner. For example, as illustrated in FIG. 4, an inboard end 84 of the torsion bar 80 may be pivotally attached to the inboard bracket 60 at the pivot hole 66 via a bushing 86 and a nut 88. An outboard end 90 of the torsion bar 80 may be pivotally attached to the outboard bracket 70 in a similar manner.

As best shown in FIG. 4, an inboard link 92 is fixedly attached to the inboard end 84 of the torsion bar 80 such that rotation of the inboard link 92 causes rotation of the torsion bar 80 about the axis 68. As will be discussed in detail below, the inboard link 92 actuates the latch assembly 34 of the inboard track assembly 30. The inboard link 92 may be formed from a stamped metallic plate. The inboard link 92 includes a forwardly extending first arm 94 and a rearwardly extending second arm 96. A pin 98 extends outwardly from the first arm 94 in the outboard direction. A pin 100 extends outwardly from the second arm 96 in the inboard direction. The pins 98 and 100 are fixedly connected to the inboard link 92.

Referring to FIG. 3, an outboard link 110 is fixedly attached to the outboard end 90 of the torsion bar 80 such that rotation of the torsion bar 80 causes rotation of the outboard link 110 about the axis 68. As will be discussed in detail below, the outboard link 110 actuates the latch assembly 36 of the outboard track assembly 32. The outboard link 110 may be made from a metallic wire or rod bent into a generally Z-shape. The outboard link 110 includes a central portion 112 generally extending in a longitudinal direction. A first arm 114 extends generally outwardly at a right angle from a proximal end 116 of the central portion 112. The first arm 114 is fixedly attached to the outboard end 90 of the torsion bar 80, such as be welding, adhesive or other fastening means. A second arm 118 extends generally outwardly at a right angle from a distal end 119 of the central portion 112. It should be understood that the inboard link 92 and outboard link 110 can be made of any suitable material and may have any suitable shape for actuating the latch assemblies 34 and 36.

The handle adjuster assembly 38 also includes the handle 22. As best shown in FIGS. 3 and 4, the handle 22 includes a grip portion 120 and a lever arm 122. The grip portion 120 may be in the form of a loop for ease of grasping by the occupant of the seat 10. If desired, the grip portion 120 may include an elastomeric covering for its preferred tactile properties. The lever arm 122 extends outwardly from the grip portion 120 and may be formed from a stamped metallic strip. The lever arm 122 includes a stop 124 formed at a distal end 126 thereof. In the illustrated embodiment of the lever arm 122, the stop 124 is in the form of a generally flat tab extending at a right angle from a central portion 128 of the lever arm 122. The central portion 128 of the lever arm 122 includes a hole 130 formed therein. The hole 130 is located between the distal end 126 and the grip portion 120 and defines a pivot axis 132.

The handle adjuster assembly 38 further includes a lever 140 which may be formed from an elongated stamped metal strip. As shown in FIG. 4, the lever 140 includes a central portion 142, a first end 144, and second end 146. The first end 144 has a hole 147 formed therethrough. A tubular bushing 148 may be disposed in the hole 147. The first end 144 of the lever 140 is pivotally attached to the central portion 128 of the lever arm 122 of the handle 22 about the pivot axis 132 by a pivot pin 150. The pivot pin 150 includes a first end 152 which is inserted through the hole 130 of the lever arm 122, the hole 147 of the lever 140, and the bushing 148. The first end 152 of the pivot pin 150 may include an integrally formed rivet head 156. During installation, the rivet head 15 is deformed radially outwardly by a forming process after insertion into the holes 130 and 147, thereby capturing and pivotally mounting the handle 22 to the lever 140. As will be discussed below, an interference between the stop 124 of the handle 22 and the central portion 142 of the lever 140 limits the rotation of the handle 22 in a first rotational direction, indicated by a directional arrow 158 in FIG. 3. However, the stop 124 does not hinder rotation of the handle 22 in a second rotational direction opposite the first rotational direction 158. The second rotational direction is represented as arrow 133 in FIG. 6.

Figure 5:
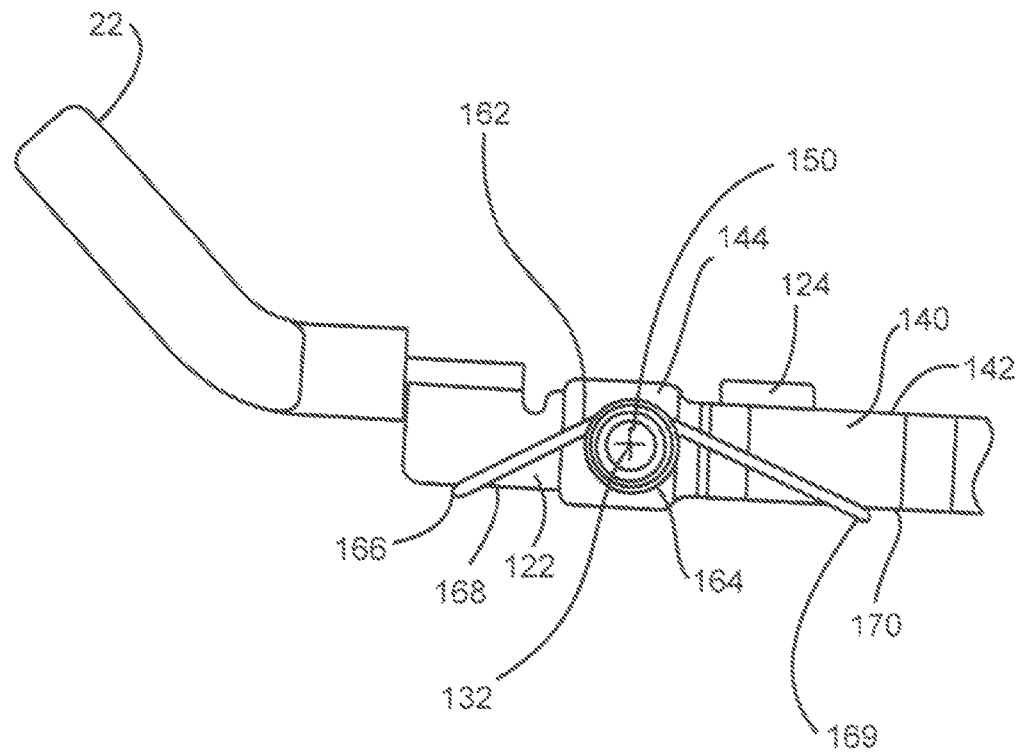
FIG. 5 is a side elevational view of a portion of the handle adjuster assembly of FIG. 3 illustrating the handle adjuster assembly in a locked position.

The pivot pin 150 includes a cylindrical extension 160 extending in an outboard direction. The extension 160 houses a spring 162 having a coil portion 164 disposed on the extension 160. One end of the spring 162 has a first tang 166 which engages with a bottom edge 168 of the lever arm 122. The other end of the spring has a second tang 169 which engages with a bottom edge 170 of the lever 140. The spring 162 biases the lever arm 122 of the handle 22 in the first rotational direction 158 relative to the lever 140 to a normal use or locked position as shown in FIG. 5.

There is illustrated in FIG. 4 a portion of the riser 44 having a hole 180 defining an axis 182. The lever 140 is pivotally connected to the riser 44 along the axis 182. The central portion 142 of the lever 140 includes a hole 184 formed therethrough. A tubular bushing 186 may be disposed in the hole 184. A pivot pin 190 has a first end 192 which is inserted through the hole 184 of the lever 140, the bushing 186, and the hole 180 of the riser 44. The first end 192 of the pin 190 may include external threads for receiving a nut 194 for pivotally mounting the lever 140 to the riser 44. Alternatively, the first end 192 of the pin 190 may include a rivet head similar to the pin 150. The pivot pin 190 includes a cylindrical extension 196 extending in an outboard direction. The extension 196 houses a spring 200 having a coil portion 202 disposed on the extension 196. One end of the spring 200 has a first tang 204 which engages with an upper edge 206 of the lever 140. The other end of the spring 200 has a second tang 208 which engages with the torsion bar 80, as shown in FIG. 3. The spring 200 biases the lever 140 (and the handle 22) in a rotational direction 210 such that the first end 144 of the lever 140 and the handle 22 are biased in a downward direction.

As best shown in FIG. 4, the second end 146 of the lever 140 includes a slot 212 formed therein. When assembled, the slot 212 receives the pin 98 from the first arm 94 of the inboard link 92. Thus, pivoting movement of the lever 140 about the axis 182 causes pivoting movement of the inboard link 92, the torsion bar 80, and the outboard link 110, the reason for which will be described below.

Figure 11:
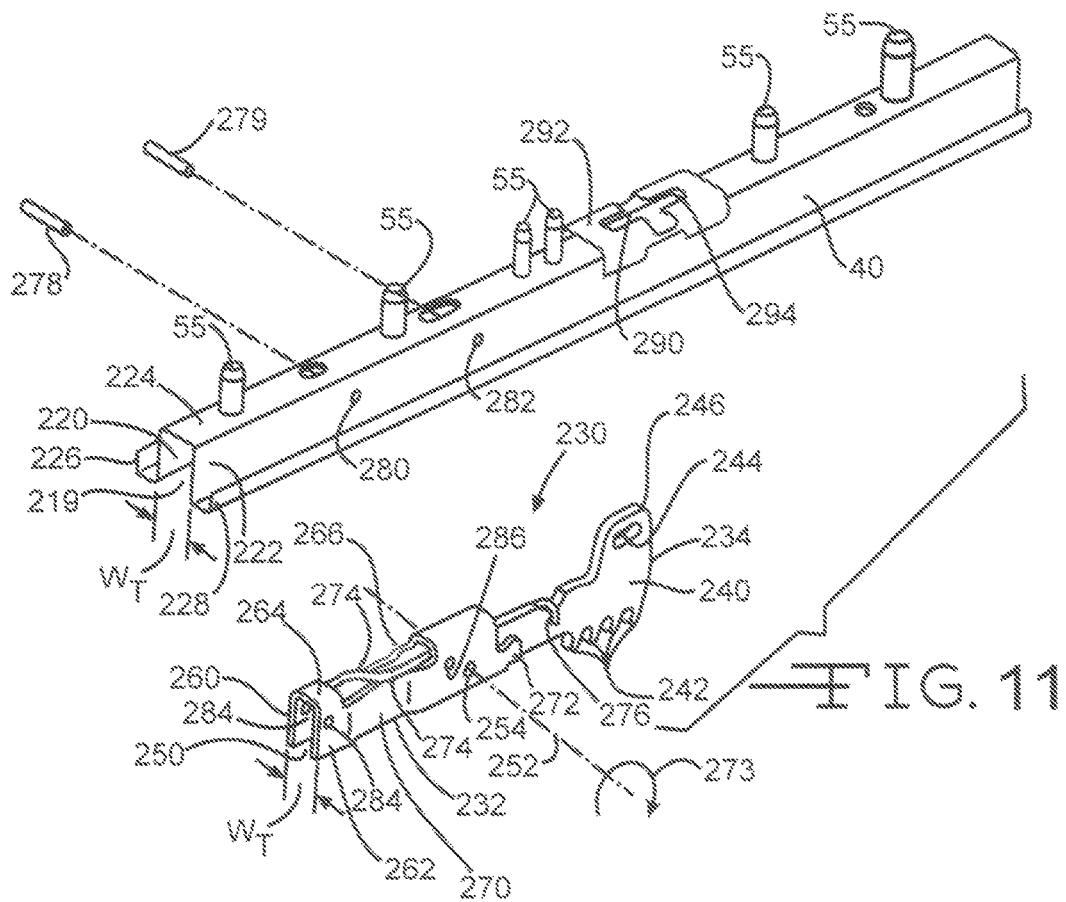
FIG. 11 is an exploded perspective view of the inboard trigger assembly and the inboard track.

Referring to FIG. 11, the components of the inboard latch assembly 34 are generally housed within an interior 219 of the upper track 40. The elongated upper track 40 includes a pair of spaced apart side walls 220 and 222 which are connected together by a generally horizontal upper web 224. The upper web 224 defines an upper portion of the upper track 40. A plurality of mounting bolts 55 extend upwardly from the upper web 136 and are used for fastening the riser 44 to the upper track 40. The upper track 40 further includes a pair of J-shaped flanges 226 and 228 that extend from the lower portions of the side walls 220 and 222, respectively. The flanges 226 may house rollers (not shown) that cooperate with flanges 223 and 225 (see FIG. 2) formed in the lower track 42 to provide for a rolling engagement as the upper track 40 translates relative to the lower track 42. The side walls 220 and 222 define an interior width $W_T$.

The inboard latch assembly 34 further includes a trigger assembly, indicated generally at 230. The trigger assembly 230 generally includes a housing 232, a pivotally mounted trigger 234 disposed within the housing 232, and a spring 236. The trigger 234 can be formed from a metal plate and may include a continuous thickness along its length. One end of the trigger 234 includes a head portion 240. A plurality of teeth 242 are formed along a bottom edge of the head portion 240. As will be discussed below, the teeth 242 are selectively moved in engagement with the apertures 48 formed in the bottom wall 49 of the lower track 42. In the embodiment shown, there are four teeth 242 formed in the head portion 240. However, it should be understood that any number of teeth 242 may be formed in the trigger 234. A slot 244 is formed through an upper portion 246 of the head portion 240. When assembled, the slot 244 receives the pin 100 of the second arm 96 of the inboard link 92.

The trigger 234 is pivotally mounted within an interior 250 of the housing 232 along an axis 252. A pin 254 may be inserted through holes formed in the housing 232 and the trigger 234 to provide for a pivotal connection. As shown in FIG. 11, the housing 232 may be formed from stamped sheet or plate bent into a generally inverted U-shape. The housing 232 includes a pair of side walls 260 and 262 connected together by an upper web portion 264. The web portion 264 may include an slot or opening 266 formed therein to accommodate the installation of the spring 236. The side walls 260 and 262 and the web portion 264 define the interior 250 of the housing 232 in which the trigger 234 is disposed. Each of the side walls 260 and 262 of the housing 232 may include recessed portions 270 and 272 which extend inwardly to reduce lateral movement of the trigger 234 within the interior 250 of the housing 232. Thus, the trigger 234 may be retained and pivotally movable within the interior 250 of the housing 232 while maintaining minimal lateral movement of the trigger 234 within the interior 250. This may be desired if the thickness of the trigger 234 is substantially less than the interior width $W_T$ of the upper track 40. This arrangement also provides for a relatively wide distance between the side walls 220 and 222 such that duplicate manufactured upper track 40 may be used in a power based seat adjuster mechanism (not shown) wherein a powered elongated threaded rod extends within the interior 219 of the upper track. This is in comparison to the prior art upper track assemblies 500 and 540 shown in FIGS. 13 through 16 and described in the Background Of The Invention section, wherein the upper track assemblies 500 and 540 are too narrow to accept such a rotating threaded rod.

The spring 236 preferably biases the trigger 234 in a rotational direction 273 such that the teeth 242 of the head portion 240 are biased downwardly towards engagement with the apertures 48 formed in the bottom wall 49 of the lower track 42. The spring 236 may include a first end 274 disposed within the opening 266 of the housing 232 and engaging with upper surfaces of the side walls 260 and 262 at the opening 266. A second end of the spring 274 may include a tang 276 which engages with a rear upper portion of the trigger 234.

During assembly, the trigger assembly 230 is installed within the interior 219 of the upper track 40. Outer portions of the housing 232 define an overall width $W_H$ defined between the outer surfaces of the side walls 260 and 262. The width $W_H$ is preferably the same size or slightly less than a width $W_T$ of the interior 219 of the upper track 40 such that the trigger assembly 230 is restricted from moving in a lateral direction. The housing 232 of the trigger assembly 230 may be fixedly installed in the upper track 40 by first and second mounting pins 278 and 279. The mounting pins 278 and 279 are inserted through holes 280 and 282, respectively, formed in the side walls 220 and 222 of the upper track 40. The mounting pins 278 and 279 also are inserted within holes 284 and 286, respectively, formed in the side walls 260 and 262 of the housing 232. Note that the outer periphery of the trigger 234 may be dimensioned so as not to strike the mounting pins 278 and 279 when the trigger 234 is moved between various positions within the housing 232.

The upper web 224 of the upper track 40 also includes a slot 290 formed therein to provide clearance for the head portion 240 of the trigger 234 to extend through. An optional reinforcement plate 292 may attached to the upper web 224, such as by welding. The reinforcement plate 292 includes a slot 296 formed therein generally corresponding to the slot 290. The reinforcement plate 292 generally surrounds the slot 290 and is used to reinforce the area of the upper track 40 at the slot 296 for vehicle impact situations. Although not shown, the upper track 50 may also include an optional reinforcement plate about its slot which provides clearance for the trigger 304.

Figure 12:
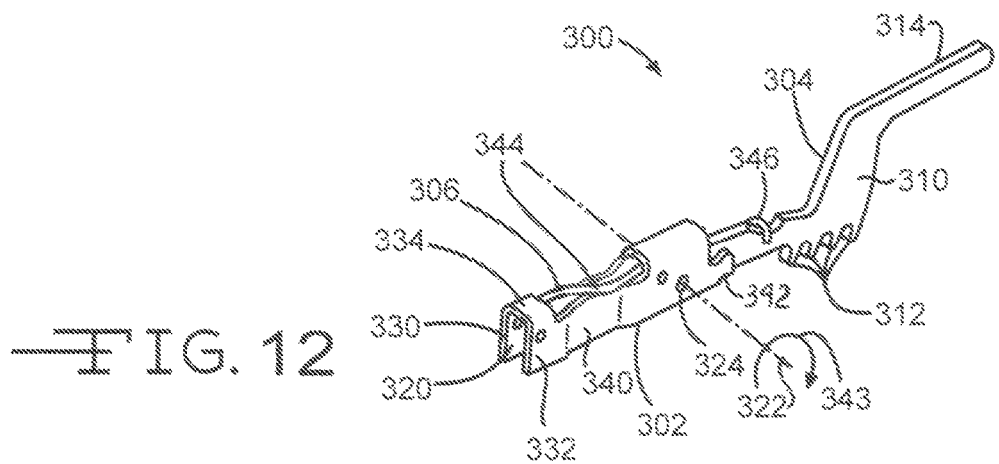
FIG. 12 is a perspective view of the outboard trigger assembly.
Figure 13:
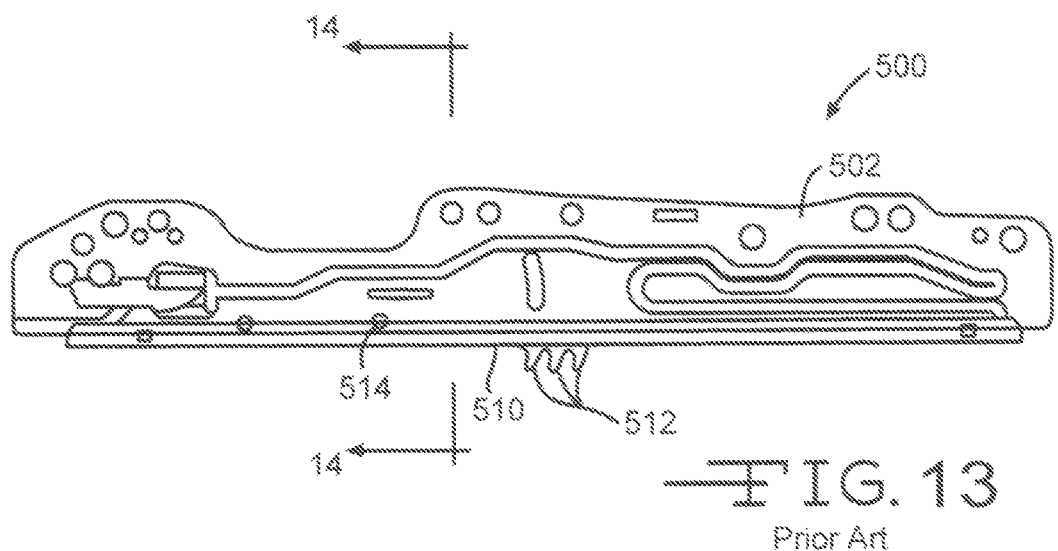
FIG. 13 is a side elevational view of a prior art outboard upper seat track assembly.
Figure 14:
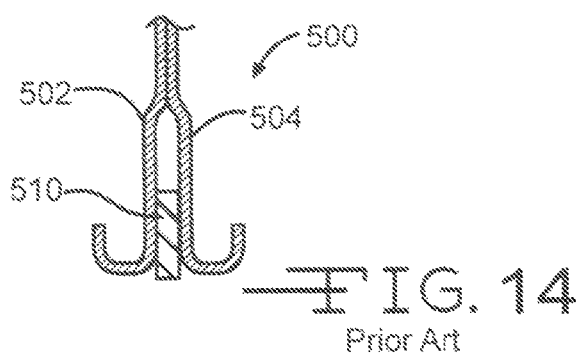
FIG. 14 is a sectional view taken along lines 14-14 of FIG. 13.
Figure 15:
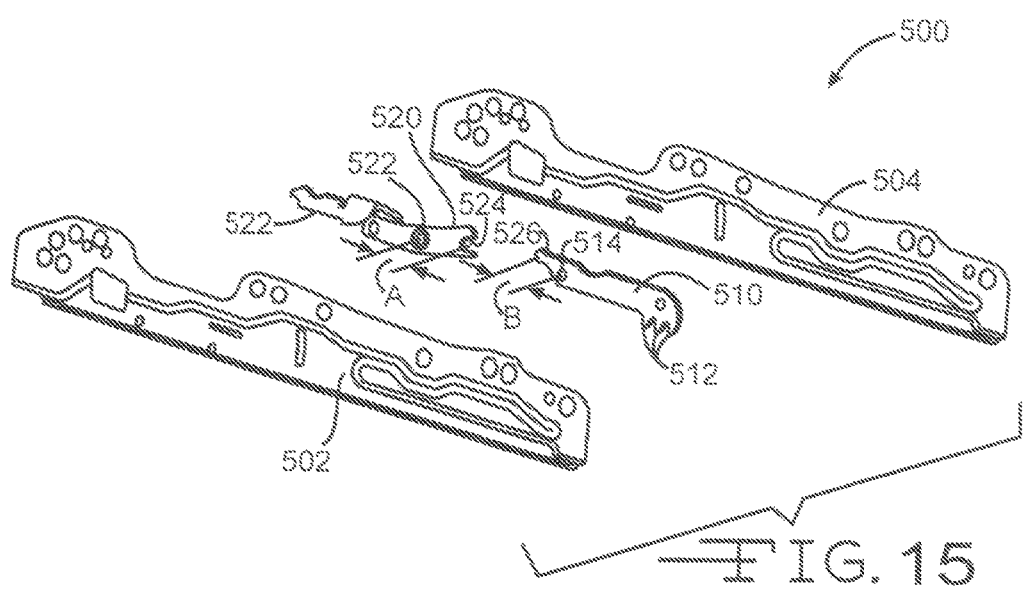
FIG. 15 is an exploded perspective view of the prior art outboard upper seat track assembly.
Figure 16:
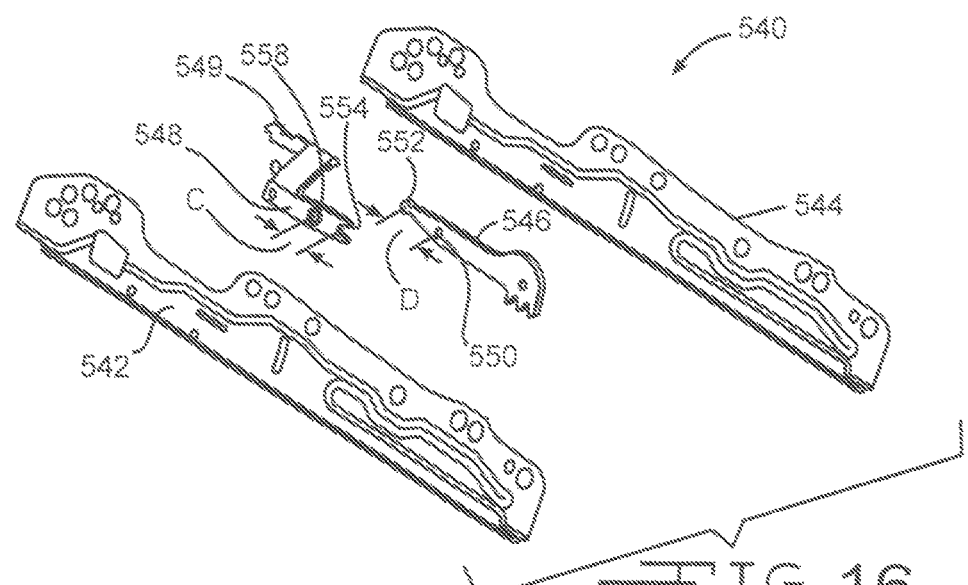
FIG. 16 is an exploded perspective view of a prior art inboard upper seat track assembly.

The outboard latch assembly 36 includes a trigger assembly, indicated generally at 300 in FIG. 12. The trigger assembly 300 is similar in function as the trigger assembly 230. The trigger assembly 300 is mounted in the interior of the upper track 50 of the outboard track assembly 32 in a similar manner as the trigger assembly 230 of FIG. 11, and as such is not shown or explained in further detail. The trigger assembly 300 generally includes a housing 302, a pivotally mounted trigger 304 disposed within the housing 302, and a spring 306. The trigger 304 can be formed from a metal plate and may include a continuous thickness along its length. One end of the trigger 304 includes a head portion 310. A plurality of teeth 312 are formed along a bottom edge of the head portion 310. The teeth 312 are selectively moved in engagement with the apertures 58 formed in the bottom wall 59 of the lower track 52 of the outboard track assembly 32. A difference between the triggers 234 and 304 is that the trigger 304 includes an arm 314 extending rearwardly from an upper portion of the head portion 310. When assembled, the arm 314 engages with the second arm 118 of the outboard link 110.

The trigger 304 is pivotally mounted within an interior 320 of the housing 302 along an axis 322. A pin 324 may be inserted through holes formed in the housing 302 and the trigger 304 to provide for a pivotal connection. The housing 302 may be formed from stamped sheet or plate bent into a generally inverted U-shape. The housing 302 includes a pair of side walls 330 and 332 connected together by an upper web portion 334. The web portion 334 may include a slot or opening 336 formed therein to accommodate the installation of the spring 306. The side walls 330 and 332 and the web portion 334 define the interior 320 of the housing 302 in which the trigger 304 is disposed. Each of the side walls 330 and 332 of the housing 302 may include recessed portions 340 and 342 which extend inwardly to reduce lateral movement of the trigger 304 within the interior 320 of the housing 302. Thus, the trigger 304 may be retained and pivotally movable within the interior 320 of the housing 302 while maintaining minimal lateral movement of the trigger 304 within the interior 320. This may be desired if the thickness of the trigger 304 is substantially less than the interior width of the upper track 50.

The spring 306 preferably biases the trigger 304 in a rotational direction 343 such that the teeth 312 of the head portion 310 are biased downwardly towards engagement with the apertures 58 formed in the bottom wall 59 of the lower track 52. The spring 306 may include a first end 344 disposed within the opening 336 of the housing 302 and engaging with upper surfaces of the side walls 330 and 332 at the opening 336. A second end of the spring 306 may include a tang 346 which engages with a rear upper portion of the trigger 304.

The operation of the seat adjuster assembly 20 will now be described. As stated above, the seat adjuster assembly 20 enables the seat 10 to be moved in fore and aft longitudinal directions relative to the vehicle floor 18. The seat adjuster 20 can be actuated between a locked position, as shown in FIGS. 1, 2, 5, 7, 9 such that the seat 10 is fixed in the fore and aft directions relative to the vehicle floor 18, and a locked position, as shown in FIGS. 8 and 10, in which the seat 10 may be moved relative to the vehicle floor 18. In the locked position, the handle 22 is not operated by the occupant and is maintained in a position as shown in FIGS. 1-5, 7, and 9. To unlock the inboard and outboard track assemblies, the handle 22 is pulled upwardly by the occupant (or other user of the seat) to actuate the handle adjuster assembly 38. When pulled upwardly, the handle 22 and the lever 140 function as a single lever member and move together simultaneously. In other words, when the handle 22 is pulled upwardly, the handle 22 is not rotated about the axis 132 relative to the lever 160. However, the handle adjuster assembly 38 is configured such that if in accidental or inadvertent downward force acts on the handle 22, such as by a passenger stepping on it, the handle 22 will harmlessly pivot downwardly about the axis 132 while permitting the lever 140 to remain in its locked position. This has an advantage over conventional seat adjuster assemblies wherein a sufficiently large downward force may damage the associated handle and lever components or cause an undesirable effect on the seat track locking mechanism.

Figure 6:
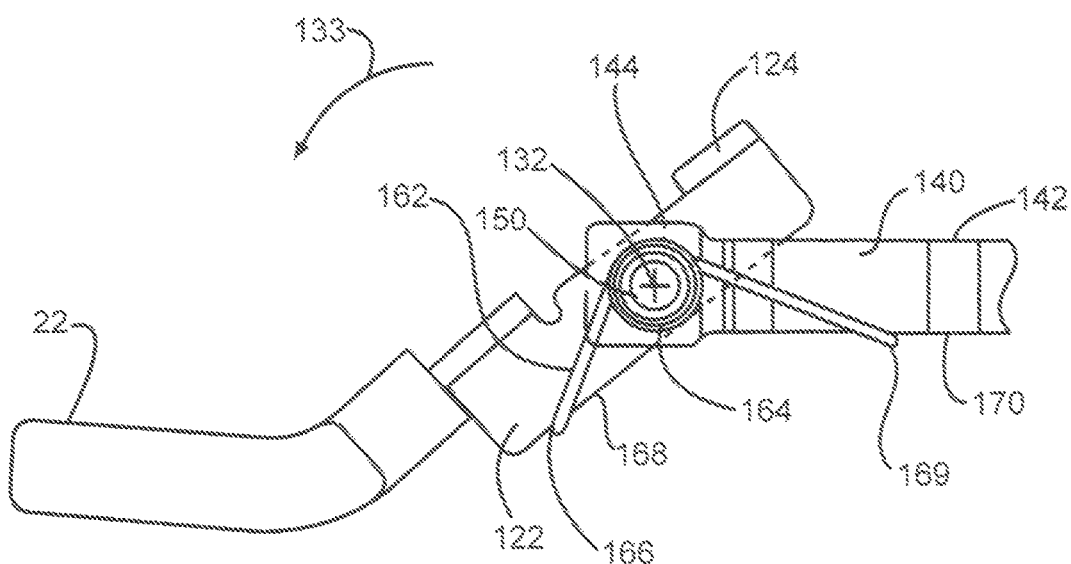
FIG. 6 is a side elevational view of a portion of the handle adjuster assembly of FIG. 5 moved to a deflected position.

As shown in FIG. 5, the handle 22 and the handle adjuster assembly 38 are in a locked position such that no force is acting on the handle 22. In this position, the spring 162 biases the lever arm 122 of the handle 22 in the first rotational direction 158 relative to the lever 140 to a locked position. Specifically, the stop 124 abuts an upper portion of the lever 140 which prevents further rotational movement of the handle 22 by the bias of the spring 162. However, when a downward force acting on the grip portion 120 of the handle 22 is sufficient to overcome the bias of the spring 162, the grip portion 120 will move downwardly and in a rotational direction opposite the rotational direction 158 to a deflected position, as shown in FIG. 6. The stop 124 will rise above the lever 140. When the force is removed (or less than the biasing force of the spring 162), the handle 22 will rotate back upwardly to its locked position. As stated above, this helps prevent damage to the handle adjuster assembly 38.

FIG. 7 illustrates the inboard side of the seat adjuster assembly 20 and the handle adjuster assembly 38 in their locked positions. In this position, no force from the occupant is acting on the handle 22. The seat adjuster assembly 20 is locked due to the engagement of the teeth 242 of the trigger 234 with the apertures 48 in the bottom wall 49 of the lower track 42. To unlock the seat adjuster assembly 20, the occupant lifts up on the grip portion 120 of the handle 22. This action causes the stop 124 to act against the lever 140 so that the handle 22 and the lever 140 move in unison. As shown in FIG. 8, the lever 140 is rotated about the pivot pin 190 (about the axis 182) in a rotational direction 211 opposite the rotational direction 210. Rotation of the lever 140 lowers the second end 146 of the lever 140 causing the inboard link 92 to rotate about the axis 68 of the torsion bar 80 (shown in section in FIGS. 7 and 8) and bracket 60 due to the interaction between the slot 212 of the lever 140 and the pin 98 of the inboard link 92. The first arm 94 of the inboard link 92 will move downwardly while the second arm 96 will move upwardly. Upward movement of the second arm 96 causes the head portion 240 of the inboard trigger 234 to move upwardly due to the interaction of the pin 100 of the inboard link 92 within the slot 244 of the head portion 240 of the inboard trigger 234. Raising of the head portion 240 causes the teeth 242 to lift out from the apertures 48, thereby unlocking the inboard side of the seat adjuster 20.

Rotational movement of the torsion bar 80 will simultaneously cause rotation of the outboard link 110 about the axis 68 of the torsion bar 80 and the brackets 60 and 70. As shown in FIG. 10, the distal end 119 of the outboard link 110 moves upwardly, thereby lifting the head portion 310 of the outboard trigger 304 due to the second arm 118 of the outboard trigger 304 lifting up on the arm 314 of the outboard trigger 304. The outboard trigger 304 pivots about the pivot pin 324 mounted in the housing 302. Raising of the head portion 310 causes the teeth 312 to lift out from the apertures 58, thereby unlocking the outboard side of the seat adjuster 20. The seat 10 can then be moved to a desired position. To move the seat adjuster assembly 20 to its locked position, the inboard and outboard links 92 and 110 rotate in opposite directions as described above, thereby lowering the triggers 234 and 304 such that their teeth 242 and 412, respectively, are inserted into different apertures 48 and 58, respectively.

Due to the different dimensions and configurations of the inboard link 92 relative to the outboard link 110, the respective head portions 240 and 310 of the inboard trigger 234 and the outboard trigger 304, respectively, rise and lower at different rates. During locking, when the head portions 240 and 310 are lowered, the teeth 242 of the trigger 234 will engage with corresponding apertures 48 prior to the teeth 312 engaging with corresponding apertures 58. As shown in FIG. 7, the horizontal distance between the pivot axis of the trigger 234 defined by the pivot pint 254 and the pin 100 of the inboard link 92 is a distance $D_1$. As shown in FIG. 9, the horizontal distance between the pivot axis of the trigger 310 defined by the pivot pin 324 and the arm 118 of the outboard link 110 is a distance $D_2$. Distance $D_2$ is greater than distance $D_1$. It can also be shown from FIGS. 7 and 9 that the arc or swing radius $R_1$ of the pin 100 of the inboard link 92 from its rotational axis 68 is less than the swing radius $R_2$ of the arm 118 of the outboard link 112. The difference in dimensions of $R_1$ and $R_2$ causes the different lifting and lowering rates of the teeth 242 and 312. This assures that the teeth 242 of the inboard trigger 234 start engagement with the apertures 48 (i.e., entering the apertures 48) before the teeth 312 of the outboard trigger 310 start engagement with the apertures 58 (enter the apertures 58). This arrangement may be desirable if a seat belt load attachment point acts on the inboard track assembly 30 but not necessarily the outboard track assembly 32. Although both track assemblies 30 and 32 should normally be locked together when the handle 22 is released, if manufacturing variation occurs to the seat adjuster 20 causes only one side to lock, it may be more important that the inboard track assembly 30 be engaged because of the heavy load acting on the inboard track assembly 30 during an impact scenario when a high seat belt load may be applied. For example, as shown in FIG. 1, a bracket 380 may be attached to the inboard track assembly 30. The bracket 380 may be attached to the upper track 40 such as by one or more of the bolts 55 which fasten the upper track 40 to the seat bottom 12. Alternatively, the bracket 380 may be attached to the riser 44 or be a portion thereof. A seat belt buckle 382 is attached to the bracket 380. The seat belt buckle 382 can be any suitable mechanism connecting to a seat belt or restraint strap (snot shown) for securing the occupant relative to the seat 10 during a vehicular impact scenario. The ends of the seat belt may be attached to portions of the vehicle other than the seat 10. For example, the end of the seat belt may be attached to a floor portion adjacent the outboard side of the seat 10, while the other end of the seat belt may be attached to a pillar or frame member located above the inboard shoulder of the occupant.

The principle and mode of operation of this invention have been explained and illustrated in its preferred embodiments. However, it must be understood that this invention may be practiced otherwise than as specifically explained and illustrated without departing from its spirit or scope.

What is claimed is:

1. A seat adjuster assembly comprising:
a track assembly including a first track and a second track that are supported for movement relative to one another;
a latch assembly that can be actuated between a locked position, wherein the first and second tracks are prevented from moving relative to one another, and an unlocked position, wherein the first and second tracks are permitted to move relative to one another; and
a handle adjuster assembly for actuating the latch assembly between the locked and unlocked positions, the handle adjuster assembly including:
a lever arm including a first end and a second end that is connected to the latch assembly, the lever arm being movable between a first lever position, wherein the latch assembly is actuated to the locked position, and a second lever position, wherein the latch assembly is actuated to the unlocked position; and
a handle that is attached to the first end of the lever arm and is movable between:
(a) a non-deflected position relative to the lever arm, wherein (1) movement of the handle in a first direction relative to the lever arm is prevented and (2) movement of the handle in a second direction relative to the lever arm that is opposite to the first direction is permitted while the second end of the lever arm remains in contact with the latch assembly, and
(b) a deflected position relative to the lever arm, wherein (1) movement of the handle in the first direction relative to the lever arm is permitted and (2) movement of the handle in the second direction is permitted while the second end of the lever arm remains in contact with to the latch assembly.

2. The seat adjuster assembly defined in claim 1 wherein the handle is pivotably movable to the non-deflected position relative to the lever arm.

3. The seat adjuster assembly defined in claim 1 wherein the handle is pivotably attached to the lever arm by a pivot pin and is pivotably movable to the non-deflected position relative to the lever arm.

4. The seat adjuster assembly defined in claim 1 wherein the handle includes a stop that (1) engages the lever arm when the handle is in the non-deflected position relative to the lever and (2) does not engage the lever when the handle is in a deflected position relative to the lever.

5. The seat adjuster assembly defined in claim 4 wherein the stop is in the form of a generally flat tab extending at a right angle from a central portion of the handle.

6. A seat adjuster assembly comprising:
a track assembly including a first track adapted to be connected to a seat and a second track adapted to be connected to a support surface, wherein the first and second tracks are mounted to each other for movement relative to one another;
a latch assembly that is actuable to both a locked position, wherein the first and second tracks are prevented from moving relative to one another, and an unlocked position, wherein the first and second tracks are permitted to move relative to one another; and
a handle adjuster assembly comprising:
(a) a lever arm including a first end and a second end that is in contact with the latch assembly, the lever arm being movable between a first lever position, wherein the latch assembly is actuated to the locked position, and a second lever position, wherein the latch assembly is actuated to the unlocked position; and
(b) a handle that is attached to the first end of the lever arm for pivoting movement between non-deflected and deflected positions relative to the lever arm, wherein:
when the handle is in the non-deflected position relative to the lever arm, (1) pivoting movement of the handle in a first direction relative to the lever arm is prevented, and (2) pivoting movement of the handle in a second direction that is opposite to the first direction relative to the lever arm is permitted while the second end of the lever arm remains in contact with the latch assembly; and
when the handle is in the deflected position relative to the lever arm, (1) pivoting movement of the handle in the first direction relative to the lever arm is permitted, and (2) pivoting movement of the handle in the second direction relative to the lever arm is permitted while the second end of the lever arm remains in contact with the latch assembly.

7. The seat adjuster assembly defined in claim 6 wherein the handle is pivotably attached to the lever arm by a pivot pin and is pivotably movable to the non-deflected position relative to the lever arm.

8. The seat adjuster assembly defined in claim 6 wherein the handle includes a stop that (1) engages the lever arm when the handle is in the non-deflected position relative to the lever arm and (2) does not engage the lever arm when the handle is in a deflected position relative to the lever arm.

\* \* \* \* \*